(12) United States Patent
Klosinski et al.

(10) Patent No.: US 10,626,755 B2
(45) Date of Patent: Apr. 21, 2020

(54) SYSTEMS AND METHODS FOR TURBINE SYSTEM OPERATION IN LOW AMBIENT TEMPERATURES

(71) Applicant: General Electric Company, Schenectady, NY (US)

(72) Inventors: Joseph Philip Klosinski, Kennesaw, GA (US); Alston Ilford Scipio, Mableton, GA (US); Sanji Ekanayake, Mableton, GA (US); Julio Enrique Mestroni, Marietta, GA (US); George Vargese Mathai, Atlanta, GA (US); Michael Anthony Cocca, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 610 days.

(21) Appl. No.: 14/638,972

(22) Filed: Mar. 4, 2015

(65) Prior Publication Data

US 2016/0258327 A1    Sep. 8, 2016

(51) Int. Cl.
*F01K 23/10* (2006.01)
*F02C 6/08* (2006.01)
(Continued)

(52) U.S. Cl.
CPC .............. *F01K 23/10* (2013.01); *F02C 6/08* (2013.01); *F02C 9/22* (2013.01); *F02C 9/50* (2013.01);
(Continued)

(58) Field of Classification Search
CPC .... F01K 23/10; F02C 6/04; F02C 6/06; F02C 6/08; F02C 9/16; F02C 9/18; F02C 9/20; F02C 9/22; F02C 9/50; F02C 9/52; F02C 7/04; F02C 7/047; F02C 7/057; F02C 7/08; F05D 2220/72; F05D 2220/75;
(Continued)

(56) References Cited

U.S. PATENT DOCUMENTS

| 4,267,692 A | * | 5/1981 | Earnest ................... F01K 23/10 |
| | | | 60/39.181 |
| 6,442,941 B1 | | 9/2002 | Anand et al. |

(Continued)

FOREIGN PATENT DOCUMENTS

| EP | 2025902 A2 | 2/2009 |
| EP | 2642092 A1 | 9/2013 |

OTHER PUBLICATIONS

European Search Report and Opinion issued in connection with corresponding EP Application No. 16158501.3 dated Aug. 1, 2016.

*Primary Examiner* — Mark A Laurenzi
*Assistant Examiner* — Loren C Edwards
(74) *Attorney, Agent, or Firm* — Fletcher Yoder, P.C.

(57) ABSTRACT

A system includes a controller communicatively coupled to a compressor. The controller is configured to sense an exhaust temperature of a gas turbine system fluidly coupled to the compressor and derive a setpoint based on the sensed exhaust temperature. The controller is also configured to actuate an inlet bleed heat valve based on the derived setpoint and an ambient temperature. The inlet bleed heat valve directs a compressor fluid from the compressor into a fluid intake system fluidly coupled to the compressor upstream of the compressor and configured to intake a fluid.

17 Claims, 4 Drawing Sheets

(51) Int. Cl.
F02C 9/52 (2006.01)
F02C 9/22 (2006.01)
F02C 9/50 (2006.01)

(52) U.S. Cl.
CPC ............ *F02C 9/52* (2013.01); *F05D 2220/72* (2013.01); *F05D 2220/75* (2013.01); *F05D 2270/05* (2013.01); *F05D 2270/0831* (2013.01); *F05D 2270/303* (2013.01); *F05D 2270/313* (2013.01); *F05D 2270/335* (2013.01); *Y02E 20/14* (2013.01)

(58) Field of Classification Search
CPC ........... F05D 2220/227; F05D 2220/05; F05D 2270/0831; F05D 2270/303; F05D 2270/335; Y02E 20/14
USPC .............................. 60/39.182; 415/175, 176
See application file for complete search history.

(56) References Cited

U.S. PATENT DOCUMENTS

| | | | |
|---|---|---|---|
| 6,543,234 B2 | 4/2003 | Anand et al. | |
| 2005/0257514 A1 | 11/2005 | Morgan et al. | |
| 2009/0241552 A1 | 10/2009 | Vega et al. | |
| 2010/0242489 A1 | 9/2010 | Saha et al. | |
| 2013/0019607 A1* | 1/2013 | Botarelli | F02C 9/00 60/773 |
| 2013/0125557 A1* | 5/2013 | Scipio | F02C 9/22 60/773 |
| 2013/0239573 A1* | 9/2013 | Brighenti | F01K 21/00 60/643 |
| 2014/0260177 A1 | 9/2014 | Reed | |

* cited by examiner

SYSTEMS AND METHODS FOR TURBINE SYSTEM OPERATION IN LOW AMBIENT TEMPERATURES

BACKGROUND

The subject matter disclosed herein relates to power generation systems. Specifically, the embodiments described herein relate to controlling a turbine system in low ambient temperatures.

In a power generation system, such as a gas turbine system, a compressor may be used to compress a fluid (e.g., air) prior to mixing the fluid with fuel for combustion. In low ambient temperatures, the power generation system may be configured to observe and maintain the operating limit of the compressor, particularly when the power generation system uses a low British Thermal Unit (BTU) fuel. Low BTU fuels include fuels that may have large concentrations of inert gases, synthetic gases, waste gases, and biomass gases.

To maintain the operating limits of the compressor in low ambient temperature conditions, the power generation system may be configured to intentionally under-fire. That is, the fuel flow is often reduced to account for reduced compression due to the design limits of the compressor in low ambient temperatures. Reducing the fuel flow may in turn lead to lower firing temperatures for the power generation system. However, intentionally under-firing the power generation system may also result in output loss, in terms of the power generated by the power generation system as well as a loss of exhaust energy which may be captured and used by other components, such as a heat steam recovery generator (HSRG). It would be beneficial to operate power generation systems in low ambient temperatures, particularly when utilizing low BTU fuels, such that the system maintains the compressor limits while minimizing intentional under-fire.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fluid intake system configured to intake a fluid and a compressor system fluidly coupled to the fluid intake system and configured to compress the fluid. The system also includes a combustor system fluidly coupled to the compressor and configured to combust a fuel mixed with the fluid, as wells as a turbine system fluidly coupled to the combustor and configured to rotate a shaft mechanically coupled to a load. Further, the system includes an inlet bleed heat system fluidly coupled to the compressor and to the fluid intake system and configured to direct a compressor fluid from the compressor into the fluid intake system. The system also includes a controller operatively coupled to the inlet bleed heat system and configured to sense an exhaust temperature of the turbine system. The controller is configured to adjust the compressor fluid flow via the inlet bleed heat system based on the exhaust temperature.

In a second embodiment, a system includes a controller communicatively coupled to a compressor. The controller is configured to sense the exhaust temperature of a gas turbine system, wherein the gas turbine system is fluidly coupled to the compressor. The controller is also configured to derive a setpoint based on the sensed exhaust temperature. Further, the controller is configured to actuate an inlet bleed heat valve based on the derived setpoint and an ambient temperature. The inlet bleed heat valve directs a compressor fluid from the compressor into a fluid intake system which is fluidly coupled to the compressor upstream of the compressor and configured to intake a fluid.

In a third embodiment, a non-transitory, computer-readable medium includes executable code having instructions. The instructions are configured to receive an input corresponding to an exhaust temperature of a turbine system and retrieve a baseload control function for a compressor system coupled to the turbine system. The instructions are also configured to retrieve data corresponding to a design limit of the compressor system and determine the difference between the operating level of the compressor system and the design limit of the compressor system. Further, the instructions are configured to calculate an exhaust temperature bias based on the baseload control function and the exhaust temperature. The instructions are configured to actuate an inlet bleed heat valve based on the exhaust temperature bias and the difference between the operating level of the compressor system and the design limit of the compressor system. The inlet bleed heat valve directs a compressor fluid from the compressor system into a fluid intake system fluidly which is coupled to the compressor system upstream of the compressor system and configured to intake a fluid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. When a set of guide vanes is described as "closed," it is intended to mean that the blades of the guide vanes are positioned at a relatively small angle. When a set of guide vanes are described as "open," it is intended to mean that the blades of the guide vanes are positioned at a relatively large angle.

Present embodiments relate to systems and methods for maintaining compressor operating limits and system output in power generation systems, such as gas turbine systems. Specifically, the techniques described herein use inlet bleed heat to maintain compressor operating limits in low ambient temperatures. More specifically, the techniques described herein relate to using inlet bleed heat to operate a compressor in low ambient temperatures, as well as adjusting the fuel schedule of the power generation system containing the compressor based on, for example, the inlet bleed heat adjustments. By utilizing inlet bleed heat to operate the compressor and adjusting the fuel schedule accordingly, the compressor may operate at the design limits during low ambient temperatures without a reduction in compression. As such, the power generation system may operate without intentionally under-firing (e.g., reducing the fuel flow) to account for reduced compression due to low ambient temperatures. As a result, the power generation system may remain at the desired firing temperature levels, increasing the output and exhaust energy of the power generation system in low ambient temperatures.

Figure 1:
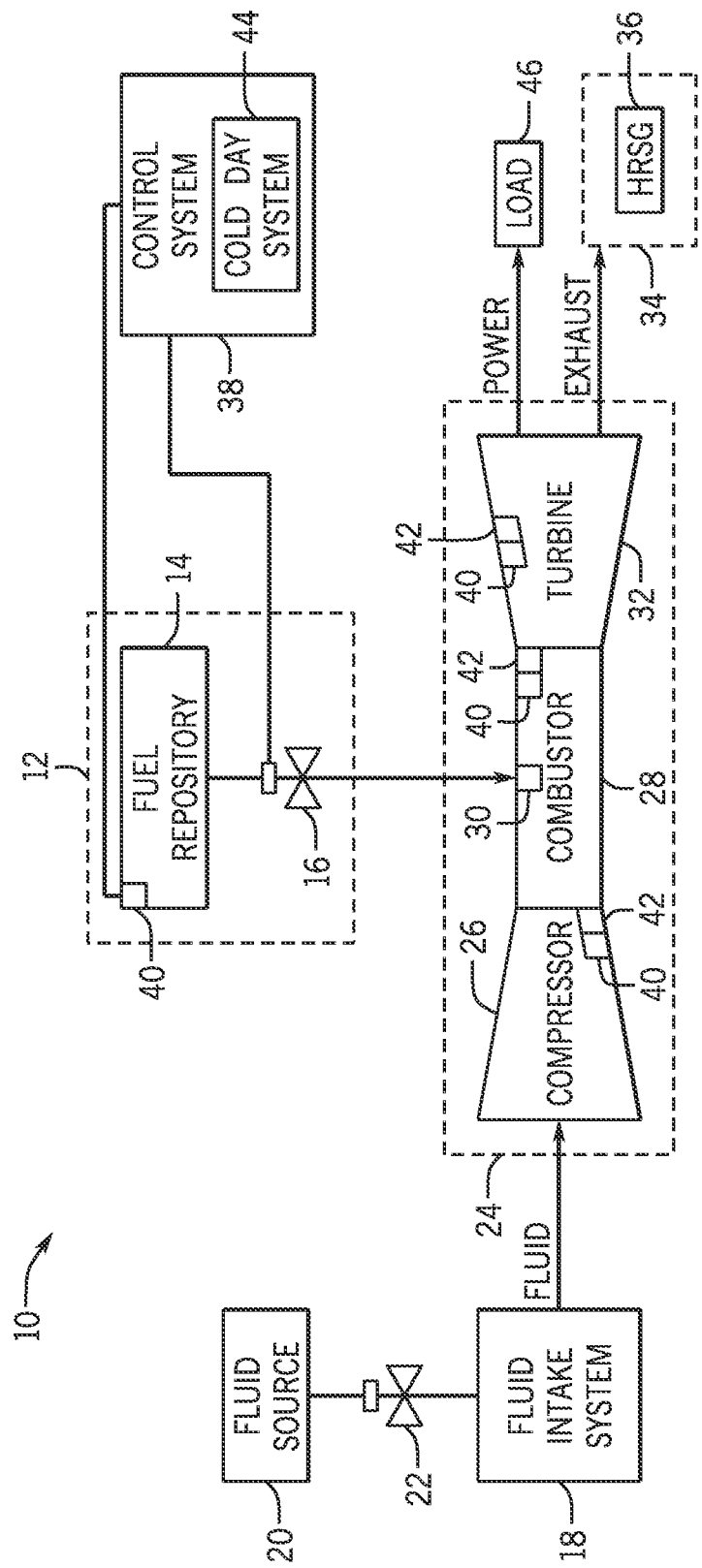
FIG. 1 is a schematic view of a power generation system, in accordance with an embodiment of the present approach.

With the foregoing in mind, FIG. 1 illustrates a power generation system 10 that may be used to provide power to a load, such as an electric generator, a mechanical load, and so on. The power generation system 10 includes a fuel supply system 12, which includes a fuel repository 14 and a fuel control valve 16 that controls the amount of fuel supplied to the power generation system 10. The power generation system 10 further includes a fluid intake system 18 coupled to a fluid source 20 and a fluid control valve 22 that controls the amount of fluid supplied to the power generation system 10. The power generation system 10 also includes a turbine system 24 which in turn includes a compressor 26, a combustion system 28 containing one or more fuel nozzles 30, a turbine 32, and an exhaust section 34. As shown in FIG. 1, the exhaust section 34 may include a heat recovery steam generator (HRSG) 36. Further, a control system 38 oversees certain aspects of the power generation system 10. In particular, the control system 36 may work in conjunction with sensors 40 and actuators 42 to monitor and adjust the operation of the power generation system 10. For instance, the sensors 40 may include temperature sensors, oxygen sensor, pressure sensors, speed sensors, fuel flow sensors, fuel type sensors, and the like, while the fuel control valve 16 and the fluid control valve 22 are examples of actuators 42. The control system 38 may also include a cold day system 44 to monitor and adjust the performance of the power generation system 10 based on the design limits of the compressor 26 and which is described in further detail below.

During operation of the power generation system 10, the fuel supply system 12 may provide fuel to the turbine system 24 via the fuel control valve 16. Similarly, the fluid intake system 18 may provide oxidant fluid (e.g., air) to the compressor 26 via the fluid control valve 22. The fluid is then compressed before being sent to the combustion system 28. Within the combustion system 28, the fuel nozzle(s) 30 inject fuel that mixes with the compressed fluid to create a fluid-fuel mixture that combusts before flowing into the turbine 32. The combusted fluid-fuel mixture drives one or more stages of the turbine 32, which may in turn drive a shaft connected to a load 46. For example, the load 46 may be a generator to produce electricity. The combusted gases exit the turbine 32 and vent as exhaust gases through the exhaust section 34. In the depicted embodiment, the exhaust gases pass through the HRSG 36, which recovers the heat from the exhaust gases to produce steam. That is, the depicted power generation system 10 may be a combined cycle or co-generation system, such that the steam is used to drive a downstream steam turbine (i.e., a combined cycle system) or for a co-generation process. Additionally or alternatively, the exhaust gases may pass through other components within the exhaust section 34, such as catalytic converter systems.

Figure 2:
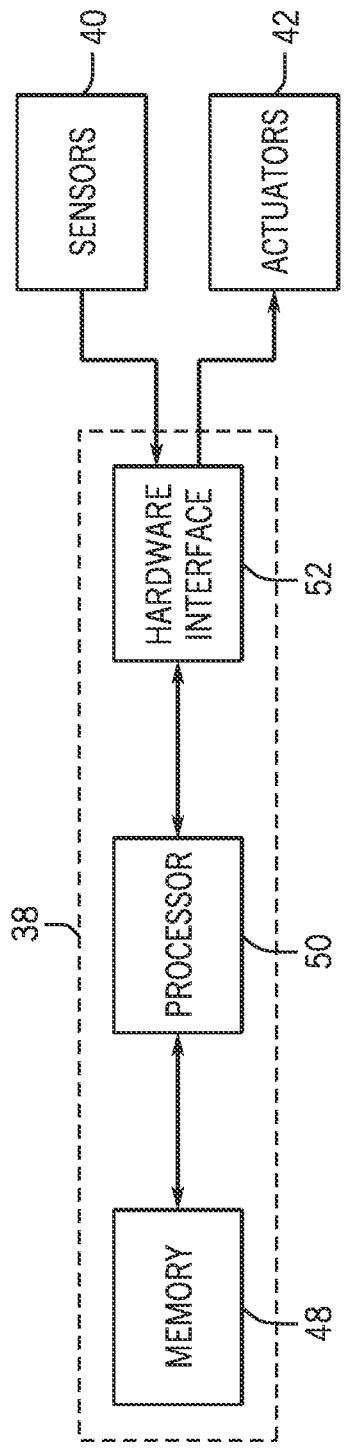
FIG. 2 is a block diagram of a control system within the power generation system of FIG. 1, in accordance with an embodiment of the present approach.

As mentioned above, the control system 38 may control certain aspects of the operation of the power generation system 10. The control system 38 includes memory 48, a processor 50, and a hardware interface 52 for interacting with the sensors 40 and the actuators 42, as depicted in FIG. 2. As depicted, the processor 50 and/or other data processing circuitry may be operably coupled to memory 48 to retrieve and execute instructions for managing the power generation system 10. For example, these instructions may be encoded in programs or software that are stored in memory 48, which may be an example of a tangible, non-transitory computer-readable medium, and may be accessed and executed by the processor 50 to allow for the presently disclosed techniques to be performed. The memory 48 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 48 as described above. The control system 38 may also communicate with the sensors 40 and the actuators 42 via the hardware interface 52, as stated above, including through wired and wireless conduits.

In some embodiments, the control system 38 may be a distributed control system (DCS), such that each component or a group of components may include or be associated with a controller for controlling the specific component(s). In these embodiments, each controller may contain memory, a processor, and a hardware interface similar to that of the control system 38 as described above. Further, in such embodiments, the controllers may include a communicative link to other controllers to coordinate decision-making.

Figure 3:
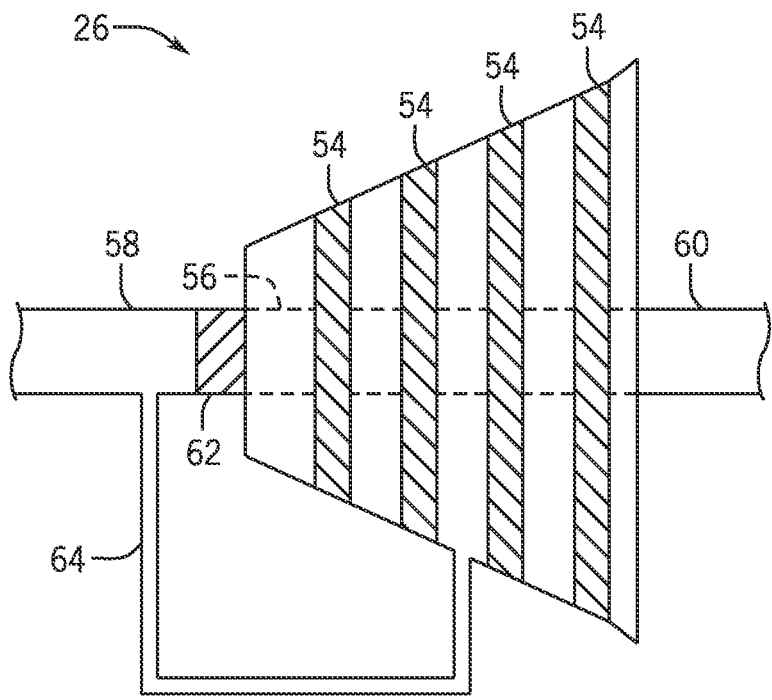
FIG. 3 is a cross-sectional view of a compressor within the power generation system of FIG. 1, in accordance with an embodiment of the present approach.

Turning now to FIG. 3, the compressor 26 may include several sets of blades 54 that are arranged in stages or rows around a rotor or shaft 56. The compressor 26 is coupled to the fluid intake system 18 via an intake shaft 58, and to the combustion system via an output shaft 60. A set of inlet guide vanes 62 controls the amount of fluid (e.g., air) that enters the compressor 26 at any given time, in contrast to the fluid control valve 22, which controls the amount of fluid delivered from the fluid intake system 18 to the compressor 26. In particular, the angles of the blades of the inlet guide vanes 62 may determine the amount of fluid that enters the compressor 26. When the angles of the blades are relatively small (i.e., "substantially closed") less fluid is received, but when the angles of the blades are relatively large (i.e., "substantially open") more fluid is received. The angles of the inlet guide vanes 62 may be controlled by the control system 38, or, as described in further detail below, by the cold day system 44.

During operation, the fluid travels through the compressor 26 and becomes compressed. That is, each set of blades 54 rotatively moves the fluid through the compressor 26 while reducing the volume of the fluid, thereby compressing the fluid. Compressing the fluid generates heat and pressure. In the present embodiments, the compressor 26 may be configured to re-circulate the compressor discharge (e.g., discharge fluid) back into the intake shaft 58 via an inlet manifold 64. The re-circulated compressor discharge fluid is commonly referred to as "inlet bleed heat," and may be used for a variety of functions, such as reducing icing on various inlets on the compressor 26 due to low ambient temperatures and protecting the compressor 26 when the inlet guide vanes 62 are closed. Accordingly, there are several commercially available inlet bleed heat systems that can be added to compressors such as the compressor 26 and incorporated into the operating software (e.g., control system 38) of the power generation system 10. Advantageously, the techniques described herein apply the inlet bleed's temperature and pressure characteristics to more efficiently operate in certain environments, such as low ambient temperatures, for example, without a substantial reduction in compression.

As mentioned above, the control system 38 oversees the operation of the power generation system 10, and ensures that each component operates within its design limits. To do so, the control system 38 may have different components and processes for monitoring each component, similar to the scheme for a distributed control system as described above. One such aspect of the control system 38 may be the cold day system 44. The cold day system 44 may monitor the operation of the compressor 38 and, in some embodiments, the fuel system 12, when the power generation system 10 operates during low ambient temperatures, and may control certain aspects of the system 10 based on the monitoring. In particular, the cold day system 44 may redirect a portion of the inlet bleed heat generated by the compressor 26 to be added to the intake fluid for the compressor 26, and may control the fuel scheduling based on the amount of inlet bleed heat fed into the compressor 26.

As will be described in further detail below, utilizing the inlet bleed heat as part of the intake fluid and adjusting the fuel scheduling may enable the compressor 26 to operate at desired margins (e.g., safety margins) of the design limits during low ambient temperatures. This, in turn, may reduce the amount of intentional under-firing of the power generation system 10 to account for compressor safety margins during low ambient temperatures, which subsequently improves the output of the power generation system 10 during low ambient temperatures. Particularly, the embodiments described herein may also improve the output of power generation systems 10 that utilize low BTU fuels during low ambient temperatures. Further, as noted above, because there are several commercially available inlet bleed heat systems, the embodiments described herein may be applied retroactively to power generation system 10 by utilizing a commercially available inlet bleed heat system and making modifications to the control system 38 as necessary. In some power plants having the system 10, the modifications may be software only, while in other power plants, the modifications may include hardware and software modifications.

In present embodiments, the cold day system 44 is part of the control system 38, and thus uses the sensors 40, actuators 42, memory 48, and processor 50, as described above. In other embodiments, the cold day system 44 may be configured on a controller as part of a distributed control system. In still other embodiments, the cold day system 44 may be separate from the control system 38, and may communicate and work in conjunction with the control system 38 as necessary.

Figure 4:
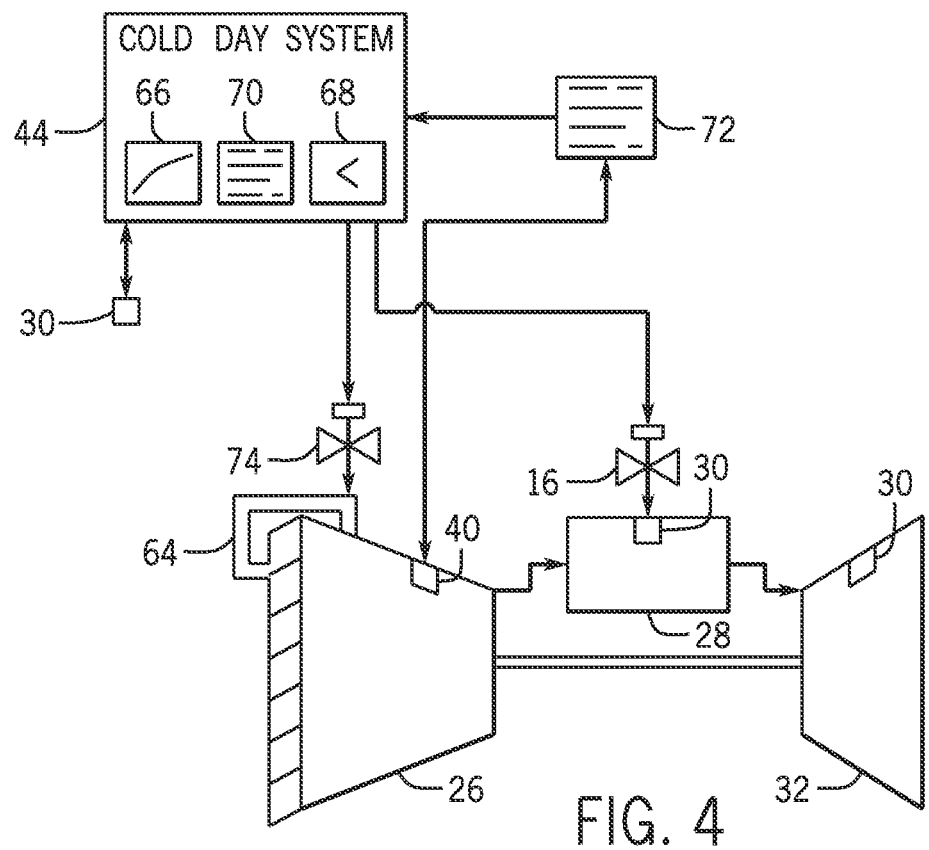
FIG. 4 is a schematic view of a cold day system included in the power generation system of FIG. 1, in accordance with an embodiment of the present approach.

Turning now to FIG. 4, the figure illustrates a schematic diagram of embodiments of the cold day system 44 communicatively coupled to the compressor 26 and combustor 28. As stated above, the cold day system 44 oversees the operation of the compressor 26, as well as other components of the system 10. The cold day system 44 may utilize a baseload control curve 66 (or similar derivation) that represents normal operating procedures for the compressor 26 (i.e., no inlet bleed heat addition at low ambient temperatures). In present embodiments, the baseload control curve 66 corresponds to a compressor pressure ratio function, which compares the pressure of the fluid exiting the compressor 26 to that of the fluid entering the compressor 26. Alternately or additionally, other baseload control curves 66 that quantify the operation of the compressor 26 may be used. The baseload control curve 66 may be stored or generated during operation by either the cold day system 44 or the control system 38. In other embodiments, the baseload control curve 66 may be calculated offline and uploaded to the cold day system 44 or the control system 38.

The cold day system 44 then determines an operating difference 68 between the design limits 70 of the compressor 26 and the current operating level 72 of the compressor 26. The data representing the design limits 70 (e.g., pressures, flows, temperatures, speeds, compression ratios) may be stored on the memory 48 in embodiments in which the cold day system 44 is part of the control system 38. Alternately, in embodiments in which the cold day system 44 is a controller within a distributed control system or separate from the control system 38, the cold day system 44 may be configured to retrieve the design limits 70 from the control system 38, or from memory in the cold day system 44. In still further embodiments, either the cold day system 44 or the control system 38 may be configured to retrieve the design limits 70 from another component or system, such as a data repository containing information about the various components of the power generation system 10. The current operating level 72 may be determined based on data received from the sensors 40 disposed in or around the compressor 26, such as the temperature or pressure of the fluid exiting the compressor 26. In some embodiments, the cold day system 44 may determine the operating difference 68 only when activated by a control signal. For instance, the cold day system 44 may only determine the operating difference 68 if the cold day system 44 or the control system 38 has determined that the ambient temperature is below a pre-set threshold.

Based on the operating difference, the cold day system 44 may control an inlet bleed heat valve 74 to add inlet bleed heat to the intake fluid of the compressor 20. By adding the inlet bleed heat, which, as mentioned above, is included in a portion of the fluid generated by compressing fluid, the temperature of the intake fluid increases as a whole. This temperature increase, in turn, increases the amount of compression of the fluid, regardless of the operating level of the compressor 26. That is, if the compressor 26 receives a fluid at a first temperature and then a second fluid at a second higher temperature, the compression at the lower temperature will be less than the compression the higher temperature, regardless of any change in the operation of the compressor 20.

Adding inlet bleed heat enables the compressor 26 to more closely adhere to the desired compressor pressure ratio function, even when the compressor 26 operates at a reduced rate due to low ambient temperatures. Further, because the compressor 26 still may adhere to the desired compressor pressure ratio, the control system 38 does not need to reduce fuel flow in order to account for a decrease in compression. Accordingly, the power generation system 10 can then maintain the desired firing temperatures during low ambient temperatures. As such, the power generation system 10 may have increased output compared to other power generation systems in which firing temperature suppression is used to maintain compressor operating limits during low ambient temperatures. The power generation system 10 may also have increased exhaust energy, which may be used by downstream components, such as the HRSG 30.

Once inlet bleed heat is added to the fluid intake, the temperature of the compressed fluid rises, as mentioned above. Subsequently, the compressor pressure ratio function, and other types of baseload control curves 66, shift based on the inlet bleed heat addition. Additionally, the exhaust gas temperature of the turbine system 24 changes relative to the exhaust gas temperature of the turbine system 24 when no inlet bleed heat is added. Based on the shifted baseload control curves 66, the cold day system 44 then calculates an exhaust temperature bias 76 that represents the change in the exhaust gas temperature due to the inlet bleed heat addition. The cold day system 44 then adjusts the inlet bleed heat addition or the fuel schedule for the turbine system 24 to maintain the desired firing temperature of the turbine system 24 while observing the design limits 70 of the compressor 26.

Figure 5:
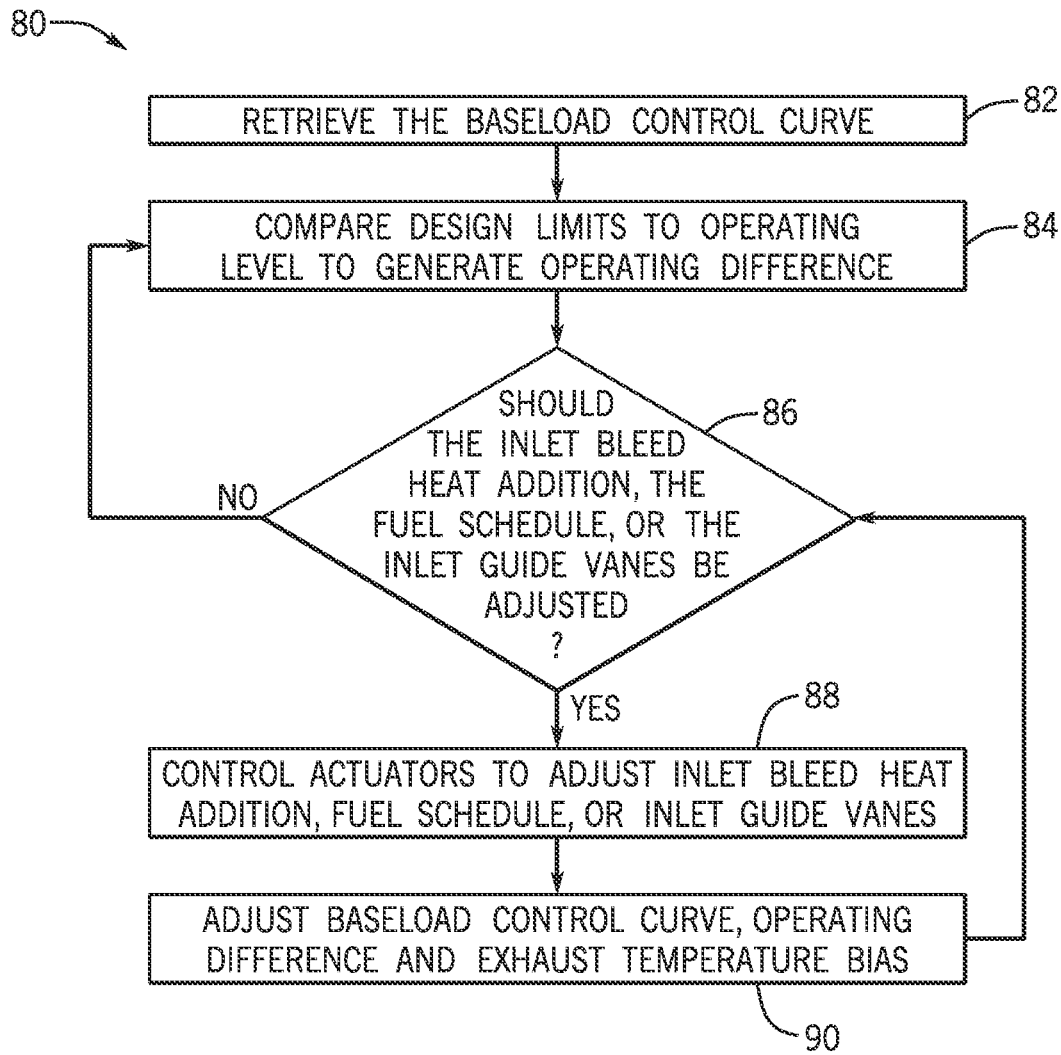
FIG. 5 is a flow chart illustrating a process for operating the cold day system of FIG. 4, in accordance with an embodiment of the present approach.

Turning now to FIG. 5, the figure depicts a flow chart of an embodiment of a process 80 suitable for adding inlet bleed heat during low ambient temperature conditions. The process 80 may be implemented as computer instructions stored in memory and executable by the cold day system 44. The cold day system 44 may execute for the instructions to better maintain the design limits 70 of the compressor 26 during operation. Although the process 80 is described below in detail, the process 80 may include other steps not shown in FIG. 5. Additionally, the steps illustrated may be performed concurrently or in a different order. The process 80 may be stored in the memory 40 and executed by the processor 42, as described above.

Beginning at block 82, the cold day system 44 may retrieve the baseload control curve 66, which may correspond to the compressor pressure ratio function, or any other control function that quantifies the operation of the compressor 26. As mentioned above, the cold day system 44 may retrieve the baseload control curve 66 from the memory 40, the control system 38, or an external system such as a data repository. Further, in other embodiments, the cold day system 44 may be configured to generate the baseload control curve 66 when the power generation system 10 is offline or during operation, or the curve 66 may be generated by the manufacturer and stored for use during system 10 operations.

At block 84, the cold day system 44 compares the design limits 70 of the compressor 26 to the current operating level 72 of the compressor 26 to generate the operating difference 68. Again, as mentioned above, the cold day system 44 may retrieve the design limits 70 from the memory 40, the control system 38, or an external system such as a data repository.

The current operating level 72 (e.g., pressure, temperature, flow, speed, compression ratio) may be determined based on the data from the sensors 40. In some embodiments, the current operating level 72 may be determined by the control system 38, and the data passed to the cold day system 44. Further, as mentioned above, the cold day system 44 may be configured to determine the operating difference 68 only upon receipt of an activation signal.

Next, at block 86, the cold day system 44 determines whether to adjust the amount of inlet bleed heat addition to the fluid intake of the compressor 26 or adjust the fuel schedule of the turbine system 24 based on the baseload control curve 66, the operating difference 68, and the exhaust temperature bias 76, if available. Further, in some embodiments, the cold day system 44 may also determine whether to adjust the inlet guide vanes 62 instead. If the cold day system 44 decides to adjust one of the three parameters, then it may proceed to block 88, which is described in detail further below. If not, then the cold day system 44 returns to generating the operating difference 68 at block 84.

At block 88, the cold day system 44 adjusts the inlet bleed heat addition, the fuel schedule, and/or the inlet guide vanes 62 as determined in block 86. To do so, the cold day system 44 actuates the inlet bleed heat valve 74, the fuel control valve 16, or the inlet guide vanes 62. In some embodiments (e.g., in a distributed control system), the cold day system 44 may send a control signal to the control system 38 to actuate any of the inlet bleed heat valve 74, the fuel control valve 16, or the inlet guide vanes 62.

Once the cold day system 44 adjusts the inlet bleed heat addition, the fuel schedule, or the inlet guide vanes 62, the cold day system 44 then determines any changes to the control functions or parameters. That is, at block 90, the cold day system 44 may determine any shifts in the baseload control curve 66, the new operating level 72 of the compressor 26 and, subsequently, the operating difference 68, or the exhaust temperature bias 76. The cold day system 44 may then return to determining adjustments for the inlet bleed heat addition, the fuel schedule, or the inlet guide vanes at block 86.

Technical effects of the invention include systems and methods for operating a power generation system during low ambient temperatures. Certain embodiments may enable components of the power generation system to operate at design limits during low ambient temperatures without reducing the output of the power generation system. For example, the present cold day system may add inlet bleed heat from the compressor to the fluid intake of the compressor, which may allow the compressor to operate at design limits during low ambient temperatures while producing the desired amount of compression. Accordingly, the present power generation system does not have to intentionally under-fire to account for reduced compression, which subsequently increases the output of the power generation system during low ambient temperatures. Further, in certain embodiments, the present cold day system may be applied retroactively to power generation systems by utilizing commercially available inlet bleed heat systems and modifications to the control system of the power generation system. The technical effects and technical problems in the specification are exemplary and not limiting. It should be noted that the embodiments described in the specification may have other technical effects and can solve other technical problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A power generation system comprising:
   a fluid intake system configured to intake a fluid;
   a compressor system fluidly coupled to the fluid intake system and configured to compress the fluid;
   a combustor system fluidly coupled to the compressor system and configured to combust a fuel mixed with the fluid;
   a turbine system fluidly coupled to the combustor system and configured to rotate a shaft, the shaft mechanically coupled to a load;
   a temperature sensor connected to the turbine system;
   an inlet bleed heat system fluidly coupled to the compressor system and to the fluid intake system and configured to direct a compressor fluid from the compressor system into the fluid intake system; and
   a controller operatively coupled to the inlet bleed heat system and configured to:
   a) retrieve an exhaust temperature of the turbine system via the temperature sensor;
   b) adjust a compressor fluid flow via the inlet bleed heat system based on the exhaust temperature and an ambient temperature;
   c) transform a baseload control curve comprising a compressor pressure ratio function into a new shifted baseload control curve based on the compressor fluid flow;
   d) determine an exhaust temperature bias based on the new shifted baseload control curve, wherein the exhaust temperature bias comprises a change in the exhaust temperature due to inlet bleed heat addition; and
   e) apply the exhaust temperature bias to adjust fuel flow for the turbine system, the compressor fluid flow, or a combination thereof, wherein the controller is operatively coupled to the combustor and configured to adjust a fuel flow of the fuel into the combustor based on the sensed exhaust temperature.

2. The power generation system of claim 1, wherein the controller is configured to adjust the compressor fluid flow via the inlet bleed heat system only when the ambient temperature is below a threshold.

3. The power generation system of claim 1, wherein the compressor system comprises a set of inlet guide vanes configured to control an amount of fluid received from the fluid intake system, and wherein the controller is configured to adjust a position of the set of inlet guide vanes based on the exhaust temperature.

4. The power generation system of claim 1, wherein the controller is configured to compare an operating level of the compressor system to a design limit of the compressor system and adjust the compressor fluid flow via the inlet bleed heat system based on the comparison.

5. The power generation system of claim 1, wherein the power generation system comprises a heat recovery steam generator fluidly coupled to the turbine system and configured to receive an exhaust gas of the turbine system.

6. The power generation system of claim 1, wherein the fuel comprises a low British Thermal Unit fuel.

7. The power generation system of claim 1, wherein the load comprises a generator configured to convert rotative motion into electrical power.

8. The power generation system of claim 1, wherein the power generation system comprises a combined cycle system.

9. A power generation system comprising:
   a controller communicatively coupled to a compressor and configured to:
   receive an exhaust temperature of a gas turbine system via a temperature sensor connected to a turbine system, wherein the gas turbine system is fluidly coupled to the compressor;
   determine a setpoint based on the sensed exhaust temperature;
   actuate an inlet bleed heat valve based on the derived setpoint and an ambient temperature, wherein the inlet bleed heat valve directs a compressor fluid from the compressor into a fluid intake system fluidly coupled to the compressor upstream of the compressor, wherein the fluid intake system is configured to intake a fluid;
   transform a baseload control curve comprising a compressor pressure ratio function into a new shifted baseload control curve based on a compressor fluid flow of the compressor fluid;
   determine an exhaust temperature bias based on the new shifted baseload control curve, wherein the exhaust temperature bias comprises a change in the exhaust temperature due to inlet bleed heat addition; and
   apply the exhaust temperature bias to adjust fuel flow for the gas turbine system, the compressor fluid flow, or a combination thereof, wherein the controller is operatively coupled to a fuel control valve included in a combustor system to adjust fuel flow based on the sensed exhaust temperature, the fuel control valve configured to deliver a fuel into the combustor, wherein the combustor is fluidly coupled to the gas turbine system and configured to combust the fuel with the fluid to provide power to the gas turbine system.

10. The power generation system of claim 9, wherein the controller is configured to actuate the fuel control valve only when the ambient temperature is above a threshold.

11. The power generation system of claim 9, wherein the setpoint comprises a compressor pressure ratio.

12. The power generation system of claim 9, wherein the controller is operatively coupled to a set of inlet guide vanes in the compressor, a position of the set of inlet guide vanes configured to control an amount of compressor fluid received by the compressor from the fluid intake system, and wherein the controller is configured to adjust the position of the set of inlet guide vanes based on the setpoint and the ambient temperature.

13. The power generation system of claim 9, wherein the controller is configured to actuate the inlet bleed heat valve only when the ambient temperature is below a threshold.

14. A non-transitory, computer-readable medium comprising executable code comprising instructions configured to:
   receive an input corresponding to an exhaust temperature of a turbine system via a temperature sensor connected to the turbine system;

retrieve a baseload control function comprising a compressor pressure ratio function for a compressor system coupled to the turbine system;

retrieve data corresponding to a design limit of the compressor system;

determine a difference between an operating level of the compressor system and the design limit of the compressor system;

actuate an inlet bleed heat valve based on the difference between the operating level of the compressor system and the design limit of the compressor system;

transform the baseload control function into a new shifted baseload control function based on a compressor fluid flow of the compressor system traversing the inlet bleed heat valve;

determine an exhaust temperature bias based on the new shifted baseload control function, wherein the exhaust temperature bias comprises a change in the exhaust temperature due to inlet bleed heat addition;

apply the exhaust temperature bias to adjust fuel flow for the turbine system, the compressor fluid flow, or a combination thereof, wherein the inlet bleed heat valve directs a compressor fluid from the compressor system into a fluid intake system fluidly coupled to the compressor system upstream of the compressor system, wherein the fluid intake system is configured to intake a fluid; and adjust a fuel flow delivered into a combustor based on a sensed exhaust temperature, wherein the combustor is fluidly coupled to the turbine system and configured to combust the fuel with the fluid to provide power to the turbine system.

15. The non-transitory, computer-readable medium of claim 14, wherein the instructions are configured to receive a second input corresponding to an ambient temperature and actuate the inlet bleed heat valve based on the ambient temperature.

16. The non-transitory, computer-readable medium of claim 14, wherein the instructions are configured to actuate a fuel control valve based on the exhaust temperature bias and the difference between the operating level of the compressor system and the design limit of the compressor system, wherein the fuel control valve is configured to deliver the fuel into the combustor fluidly coupled to the compressor system and the turbine system.

17. The non-transitory, computer-readable medium of claim 14, wherein the instructions are configured to adjust a position of a set of inlet guide vanes of the compressor system, wherein the set of inlet guide vanes is configured to control an amount of the compressor fluid received by the compressor system.

\* \* \* \* \*